(12) United States Patent
Khan

(10) Patent No.: US 8,781,521 B2
(45) Date of Patent: Jul. 15, 2014

(54) DOUBLE NUMBER SERVICE

(75) Inventor: Abrar Ali Khan, Islamabad (PK)

(73) Assignee: Rockville Technologies Private Limited, Islamabad (PK)

(*) Notice: Subject to any disclaimer, the term of this patent is extended or adjusted under 35 U.S.C. 154(b) by 0 days.

(21) Appl. No.: 13/528,826

(22) Filed: Jun. 20, 2012

(65) Prior Publication Data
US 2013/0157716 A1  Jun. 20, 2013

(30) Foreign Application Priority Data
Jun. 21, 2011  (PK) .................................... 458/2011

(51) Int. Cl.
H04M 1/00 (2006.01)
H04M 7/00 (2006.01)
(52) U.S. Cl.
USPC .......................................... 455/551; 379/219
(58) Field of Classification Search
USPC ............... 455/551, 445; 379/220.01, 221.01, 379/211.02, 219; 370/352, 351, 355, 356
See application file for complete search history.

(56) References Cited

U.S. PATENT DOCUMENTS

| | | | | |
|---|---|---|---|---|
| 5,946,618 A * | 8/1999 | Agre et al. | | 455/428 |
| 8,027,332 B1 * | 9/2011 | Martin et al. | | 370/352 |
| 8,391,915 B2 * | 3/2013 | Bishop | | 455/550.1 |
| 8,504,678 B2 * | 8/2013 | Bishop | | 709/224 |
| 2004/0202302 A1 * | 10/2004 | Richards | | 379/201.12 |

* cited by examiner

Primary Examiner — Sonny Trinh
(74) Attorney, Agent, or Firm — Symbus Law Group LLC; Clifford D. Hyra

(57) ABSTRACT

Embodiments disclosed herein describe a double number service configured to allow a mobile or landline subscriber to receive an additional telephone number that is configured to make and receive communications such as telephone calls and text messages. Telecommunications systems and methods disclosed herein are configured to utilize a virtual phone number or double numbers, which a user may subscribe to, to publish and/or communicate to other users. The user may also subscribe to multiple virtual numbers, and use the virtual numbers on a single device. Accordingly, an end user may receive communications to an assigned number from a telecommunications service provider and the virtual or double number on the same telecommunications device.

21 Claims, 12 Drawing Sheets

DOUBLE NUMBER SERVICE

This application claims priority to Pakistani patent application number 458/2011, filed Jun. 21, 2011, which is hereby incorporated by reference in its entirety.

BACKGROUND

1. Field

This disclosure relates to systems and methods within the field of telecommunications. More specifically, the disclosure relates to double numbers on a telecommunications network.

2. Description of Related Art

Generally, existing telecommunication service companies will assign an end user with a telephone number. The end user may receive and/or transmit phone calls and Short Message Service (SMS) messages to other users via the assigned identification number. Along with desired communications, the end user may also receive unwanted calls, such as from telemarketers. However, the unwanted calls may not be blocked via call blockers unless the call blockers also block important/desired communications as well.

In conventional telecommunications systems, an end user is assigned a single number for a specific device, the end user may be unable to maintain different connections and communicate. For example, an end user may have a telephone number for work or official business and a telephone number for personal use, however the end user may not be able to receive or transmit communications for both numbers on a single device.

Needs exists for improved telecommunications services.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. In certain embodiments, the disclosed embodiments may include one or more of the features described herein.

Embodiments disclosed herein describe a double number service configured to allow a mobile or landline subscriber to receive an additional telephone number (double number) that is configured to make and receive communications such as telephone calls and text messages. Telecommunications systems and methods disclosed herein are configured to utilize a virtual phone number or double numbers, which a user may subscribe to, publish and/or communicate to other user via the virtual phone number.

The user may also subscribe to multiple double numbers, and use the double numbers on a single device. Accordingly, an end user may receive communications to an assigned number from a telecommunications service provider and the virtual or double number on the same telecommunications device.

Primary numbers usually stay with a mobile subscriber for a very long time and as a result the owner may be hesitant to share that number openly on business cards or in newspaper advertisement when they are selling something. A double number allows them to give out a Full MSISDN to people they do not know well or in newspaper advertisements, without exposing their primary number to incessant calls from people they do not know well or from past newspaper advertisements posted for items already sold. When a call is received on a double number it may show up with 66 or other prefix before the caller's mobile number/MSISDN, therefore allowing the user to clearly identify that, for example, this call needs to be ignored because the double number was listed in the newspaper.

The system allows users to setup 2 different circles. For example a user's work number could be the user's double number and the user's primary number could be for friends and family. This way users do not need to carry two different phones or purchase a two-sim phone because they can immediately identify that if the incoming call has the 66 prefix then it is for work, and can choose not to take it after working hours or treat it with priority and answer it. Similarly, once a user leaves the job they can disconnect the double number without losing their primary number, and that way they will never receive calls related to their past employer on their personal number, etc.

Any telephone call or communication to or from a double number may be routed via any means to a platform that may determine an end user's preferences associated with the double number, to proceed with any communication. In one embodiment, the preferences may include bridging a telephone communication, SMS message or call to the end user's active phone number or double number based on a time of day or calling number pattern, or forwarding a received call to the end user's voicemail associated with either a double number or assigned number with or without the end user listening to the call, receiving a menu of options before the end user is connected to the call, audibly outputting the name of a caller on a speaker on the device in the voice of the caller for better recognition of the caller, blocking a telephone call, etc.

In other example embodiments, a virtual number may be provisioned or allocated to an existing subscriber identity module (SIM) and/or mobile station international subscriber directory number (MSISDN). The platform may be configured to provision or allocate double numbers via SMS, unstructured supplementary service data (USSD), interactive voice response (IVR), electronic mail, via a web based graphical interface or any other known data communications means for automatic number assignments from a double number pool. In other embodiments, based on account information from a sales office, such as a type of telephone plan, the platform may assign special double numbers such as user-configured double numbers or numbers with matching digits if the desired virtual number exists in the virtual number pool.

In further embodiments, an end user may use either the number assigned by a service provider or double number to make/receive telephone calls and send SMS messages.

In another embodiment, the IVR may be configured for simpler deployment and integration with existing telecommunication equipment.

In further example embodiments, the platform may be configured to receive a telephone call or sms from a double number subscriber via a prefix number to allow the double number subscriber to initiate a telephone call or sms using the double number as the caller id for the telephone call or sender id for the sms. Upon a second user receiving a call from a double number subscriber using the double number, the second user may call the double number subscriber back via the associated double number.

Embodiments may be configured to allow for automatic and seamless integration with any existing telecommunication value added services (VAS) that do not require dialing prefixes, for services such as ring back tones, missed call alerts, etc.

In further embodiments, platforms may be configured to perform call and/or SMS blocking and filtering for a primary number assigned by a service provider and/or a double number. The blocking and filtering may be set up via IVR, SMS commands, or any other interface such as a graphical web-based user interface or via email.

Further features for a double number service may include the following for communications to and from the double number subscriber:

- Prefix-based usage for a double number for identification, and automatically using the same double number for call back.
- Automatic seamless integration with any existing VAS services not requiring a dial prefix, e.g. ring back tones, missed call alerts, etc.
- Extensive call/SMS blocking and filtering features, setup via IVR and SMS commands.
- Flexible availability schedule for the double number, e.g. professional subscribers can set a schedule of 9 am to 5 pm and will not be annoyed by callers in the evening or night without having to switch off their phone and miss calls from friends and family.
- Double number subscribers are notified about service status changes and billing, reminders via SMS.
- Double number retention may extend for a threshold time period (i.e. 3 months) for the double number subscriber even if unsubscribed from the service.
- Double number recycling only when they are needed, i.e. no more numbers in the pool, and not used in the last three months. This may give a time interval much longer than three months between different users of the same double number, eliminating calls from people looking for the older subscriber.
- Simple billing of calls and SMS without additional integration due to the service being based on IVR.
- Call Detail Record (CDR) data can be shared automatically at predefined time intervals via Secure Shell (SSH), Secure File Transfer Protocol (FTP), rsync, or other mutually decided mechanisms.
- CDR data can also be pulled by other applications.
- Live online support, monitoring, and maintenance.
- On-site support according to agreed-upon Service-level Agreements (SLAs).
- Allowing number provisioning by subscriber's choice.
- Integration with existing customer care interfaces of the organization.
- Extensive integration with billing possible as collaborative development between the two organizations.
- Integration for billing records and transactions reconciliation with additional development efforts at both organizations.
- Reverse RingBack Tone (RBT) component allowing subscribers to listen to their choice of music/content while waiting for the other party to pick up the call, rather than being forced to listen to other's choice.
- Call/SMS blocking can be made available and configured via a graphical user interface on a user device.
- A schedule of time periods when the double number is available to receive calls can also be made available on a graphical user interface.

A new double number system (which may be embodied on a server) includes a database configured to include a mapping of subscribers, each entry within the mapping including a primary number and a double number for a double number subscriber, a receiver configured to receive data associated with a communication from the double number subscriber to a receiving party, the data including the primary number associated with the double number subscriber and a receiving party number associated with the receiving party, a processor configured to determine if the communication is associated with the double number subscriber and to modify the data to include the double number for the double number subscriber, and a transmitter to include transmit data including the double number for the double number subscriber and the receiving party number.

The received data may include prefix information preceding the primary number associated with the double number subscriber. The processor may be configured to determine if the communication is associated with the double number subscriber based on the prefix information and the mapping. The prefix information may be the same for each double number subscriber. The double number may be configured to be displayed at a device associated with the receiving party. The communication may be one of a short message service message or a telephone call. The primary number may be assigned by a service provider and the double number may be assigned by the double number server. The double number subscriber may have a plurality of double numbers.

A new double number system (which may be embodied on a server) includes a database configured to include a mapping of subscribers, each entry within the mapping including a primary number and a double number for a double number subscriber, a receiver configured to receive data associated with a communication from a first party to the double number subscriber, the data including a primary number associated with the first party and the double number for the double number subscriber, a processor configured to determine if the communication is associated with the double number subscriber and to modify the data to include the primary number for the double number subscriber, and a transmitter configured to transmit data including the primary number for the double number subscriber and the primary number associated with the first party.

The data the transmitter is configured to transmit may include prefix information preceding the primary number associated with the first party. The processor may be configured to determine if the communication is associated with the double number subscriber based on the received data including the double number for the double number subscriber and the mapping. The processor may be further configured to block the transmitter from transmitting data based on user preferences, the user preferences being stored within the mapping. The user preferences may be one of blocking user-requested numbers and blocking numbers according to a time of day. The primary number of the first may be configured to be displayed along with prefix information at a device associated with the double number subscriber, the prefix information indicating that the communication was to be communication to the double number. The communication may be one of a short message service message or a telephone call. The primary number may be assigned by a service provider and the double number may be assigned by the double number server. The double number subscriber may have a plurality of double numbers.

A new double number system (which may be embodied on a server) includes a database configured to include a pool of double numbers, a processor configured to receive a request from a user for a double number within the pool of double numbers and to assign one of the double numbers based on the request, the user request including a primary number assigned by a service provider, and an index configured to include a mapping of the primary number, at least the double number assigned to a subscriber and user preferences of the user. The user preferences may be one of blocking numbers for user requested numbers and blocking numbers according to a time of day. The request may include a desire to be assigned to a specific double number.

In a new double number method, data associated with a communication from a double number subscriber to a receiving party is received, where the data includes the primary number associated with the double number subscriber and a receiving party number associated with the receiving party, the communication is determined to be associated with the double number subscriber and the data is modified to include the double number for the double number subscriber, and data is transmitted including the double number for the double number subscriber and the receiving party number. The received data may include prefix information preceding the primary number associated with the double number subscriber and determining that the communication is associated with the double number subscriber may be based on prefix information and mapping a primary number to a double number for a double number subscriber.

In a new double number method, data associated with a communication from a first party to the double number subscriber is received, the data including a primary number associated with the first party and the double number for the double number subscriber, the communication is determined to be associated with the double number subscriber and the data is modified to include the primary number for the double number subscriber, and data is transmitted including the primary number for the double number subscriber and the primary number associated with the first party.

In a new double number method, a request is received from a user for a double number within a pool of double numbers and one of the double numbers is assigned based on the request, the user request including a primary number assigned by a service provider, and the primary number is mapped at least to the double number assigned to a subscriber and user preferences of the user.

BRIEF DESCRIPTION OF THE DRAWINGS

The features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
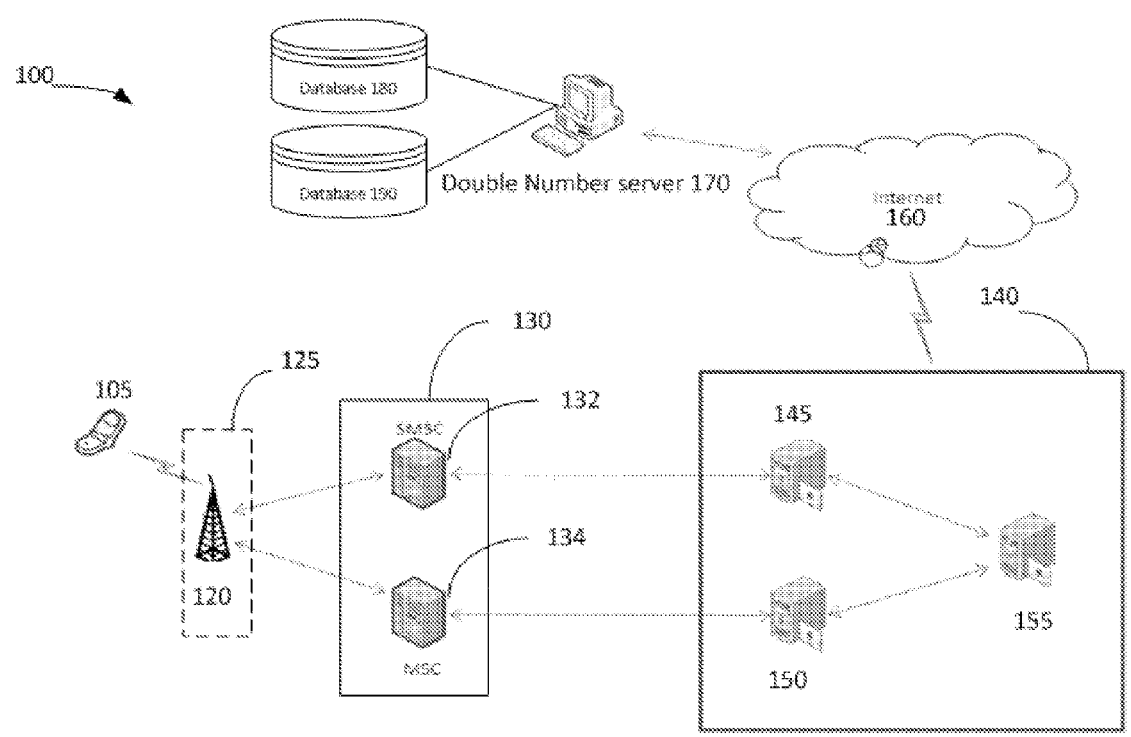
FIG. 1 depicts a double number system according to an embodiment.

Detailed example embodiments are disclosed herein. However, specific structural and functional details disclosed herein are merely representative for purposes of describing example embodiments. Example embodiments may be embodied in many alternate forms and should not be construed as limited to only the embodiments set forth herein. Example embodiments are capable of various modifications, equivalents, and alternatives. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments: As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms, "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A double telephone number may allow a user utilizing a mobile device or landline connection to maintain connections to a plurality of telephone numbers simultaneously. Any call or communication from or to a double number may be routed to a platform or server configured to check and/or determine preferences or configurations associated with a user assigned to the double number, and route the communication. The double number service may be configured to be deployed on multiple servers with redundancy communicably coupled to a telecommunications service provider. The double number service may be configured to be coupled over any known telecommunications medium for SMS, IVR access and telephone communications.

FIG. 1 depicts an example embodiment of a telecommunications system 100 for allowing communications and/or transmissions of data between devices utilizing a double number.

System 100 may include a device 105, base station 120, mobile station controller (MSC) system 130, server system 140, internet 160, and platform 170.

Device 105 may be either a mobile device or a landline communicatively connected device communicatively coupled to a base station 120 supporting a network 125 such as a Code Division Multiple Access (CDMA) wireless network, Public Switched Telephone Network (PSTN), Global System for Mobile Communications (GSM) network, or any other known network configuration. Device 105 may operate by transmitting or receiving communications with network 125 via base station 120.

Base station 120 may be associated with a service provider generally providing/communicating data to device 105. Typically, device 105 will register with an available network-associated base station 120 for a service provider associated with device 105. The service provider will then assign device 105 a primary identification, such as a primary telephone number.

Network 125 may be configured to communicate with a mobile station controller (MSC) system 130 allowing device 105 to conduct various voice, text and other data communications with other devices such as mobile telephones and/or landline telephones. As one skilled in the art will understand, although network 125 is illustrated within only one base station 120, network 125 may include a large number of base stations, telecommunications networks, and servers that extend across varying geographic regions.

Upon network 125 receiving a communication from a device 105, network 125 may forward the communication to MSC system 130. MSC system 130 may be configured to provide support for communications from device 105, such as by routing calls and text messages. MSC System 130 may include a short message service center (SMSC) 132 configured to provide service for SMS messages, and a MSC 134 configured to provide service for telephone calls.

Communicatively coupled to MSC system 130 may be server system 140. Server system 140 may facilitate initiated communications, e.g., a phone call or SMS message from device 105 via MSC 130. Thus, server system 140 may generally provide a platform for or otherwise generally support data or processes associated with allowing a device 105 to communicate with other networked devices. Server system 140 may include an SMS server 145, IVR server 150, and an application server 155. Application server 155 may be communicatively coupled to SMS server 145 and IVR server 150, and may be configured to provide services such as security services, transaction support, load balancing and management of data traffic within server system 140.

SMS server 145 may be communicably coupled to SMSC 132 via an Ethernet, or any other known network to receive text or data messages. IVR server 150 may be connected to MSC 134 over a telecommunications network, such as a digital telecommunications network, time division multiplexing network, CDMA, 3G network, voice over IP network, etc. to receive telephone communications. Upon receiving a communication to or from device 105, server system 140 may determine if the communication is to or from a double number. If it is determined that the call is to or from a double number, server system 140 may forward the communication to double number server 170 over network or internet 160. In one example embodiment, double number server 170 may be coupled to server system 140 via virtual private number (VPN). All incoming calls/SMS traffic to a number within a series allocated to double numbers will be tagged, flagged or identified by an MSC system 130 as a double number. For outgoing calls from a double number, a caller may enter prefix information before dialing a desired telephone number, and calls/SMS traffic with the prefix information may be routed to double number server 170.

Double number server 170 may be configured to provision double numbers to device 105 and provide support for double number subscribers. To provision a double number to device 105, double number server 170 may request or allocate a number series for double numbers being used by MSC system 130. For example, double number server 170 may request that a series of double numbers from 0333-0000000 to 0333-0009999 be allocated. This series may be defined as an 11 digit IVR extended short-code with 0333000 prefix (on all MSC's). However, in other embodiments, different extended short codes or series or numbers may be allocated based on network settings. For example, for a telephone system in the United States double number server 170 may request a series of double numbers from (321)-555-0000 to (321)-555-9999 be allocated.

Double number server 170 may include a double number database 180 configured to store available double numbers. Upon receiving a request from a device 105 for a double number, double number server 170 may perform a query on double number database 180 to determine available double numbers. Then, double number server 170 may assign the next available double number to device 105. In further example embodiments, a request for a double number may include a request for specific double numbers, such as user-configured double numbers or numbers with matching digits.

Double number server 170 may also include a database, look-up-table or index 190. Each entry within the database or look-up-table 190 may include an assigned double number, a primary telephone number assigned to device 105, customer information and customer preferences. Customer preferences may be associated with a double number and may be information such as a schedule of the customer. One such customer preference may be associated with a professional subscriber to a double number, who may set a schedule between 9 pm to 5 pm. Calls to the double number that are sent outside of this time period will not be connected or will be routed to voicemail. Therefore, calls to the double number of the subscriber will not annoy the customer in the evening or night without having to switch off device 105, while calls to the primary number associated with the service provider may still be connected. Further, customer information may include billing reminders, subscriber length of current paid-for subscription, and notification preferences.

Figure 2A:
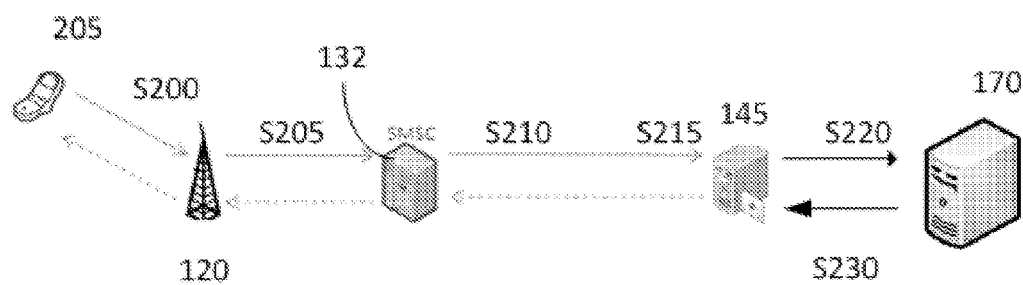
FIG. 2a depicts a double number system provisioning a double number according to an embodiment.
Figure 2B:
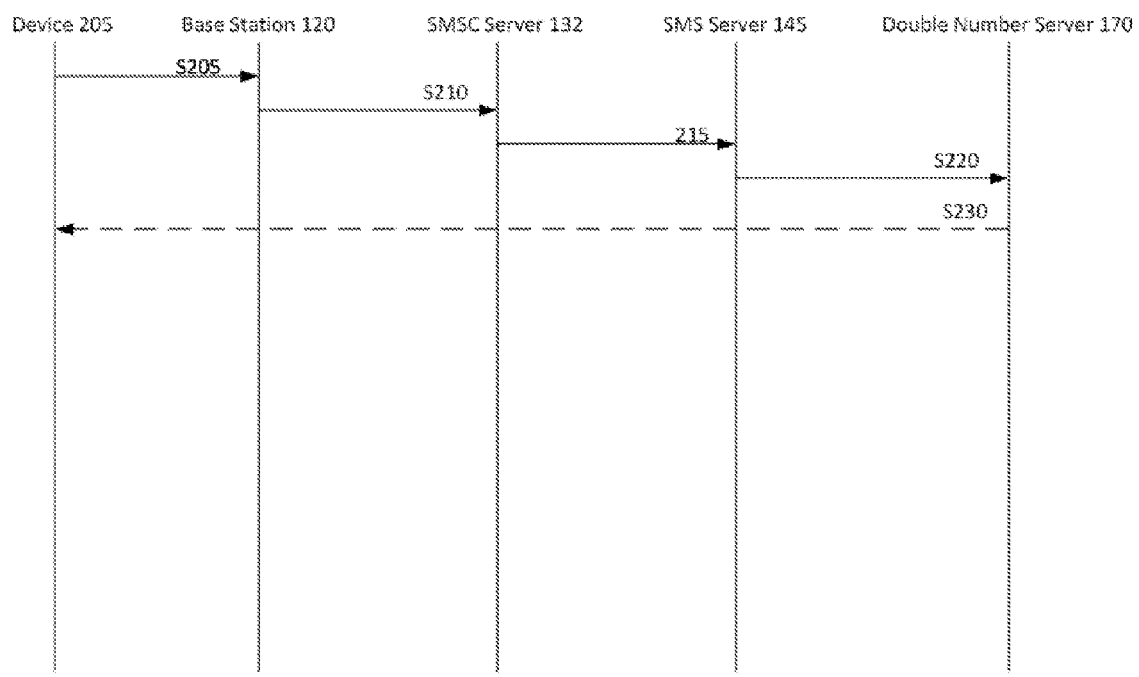
FIG. 2b depicts a flow diagram for provisioning a double number according to an embodiment.

FIG. 2a depicts a hardware diagram for an example embodiment of a system 200 for a subscriber 205 requesting a double number from double number server 170. Accompanying FIG. 2a is a flow diagram 2b for a user requesting a double number.

In S200, a subscriber 205 may send a request for a double number to base station 120. The request may be an SMS message with a predetermined or allocated double number request identifier. For example, in one embodiment, the double number request identifier may be an SMS message with an identifier "661".

In S205, base station 120 may forward the request to SMSC 132.

In S210, SMSC 132 may receive the SMS message with the double number request identifier from subscriber 205, and the primary telephone number associated with device 105. SMSC server 132 may parse the SMS message and determine that the message includes a double number request identifier, then SMSC Server 132 may forward the request for a double number to SMS server 145 in S215 which may forward the request to double number server 170 along with the primary telephone number associated with the subscriber 205 via the SMPP Large Account (LA)—the LA of the SMPP protocol over TCP/IP is used by an SMS server to send and receive SMS with an SMSC In S220, double number server 170 may receive data associated with the request for the double number and the primary telephone number associated with the subscriber 205. Double number server 170 may then allocate the next available number to subscriber 205. A mapping of the allocated double number and the telephone number associated with the subscriber may then be stored in a look-up-table or database within double number server 170. In further embodiments, the allocation of a double number to any telecom subscriber may follow an established policy which could be based on the region of the primary number or the location of the subscriber at the time of subscription.

In S230, double number server 170 may communicate the allocated double number to subscriber 205 via SMS server 145, SMSC 132 and base station 120. For example, the double number may be communicated from double number server 170 to subscriber 205 via SMS.

One skilled in the art will understand that the double number request may be made via IVR, a mobile web interface, unstructured supplementary service data (USSR) interface, or a help line call instead of an SMS message. In further embodiments, the subscriber may request a second double number via an SMS message, IVR, a mobile web interface or a help line call.

In further embodiments, if the telecommunication service provider has a policy regarding number retention by a customer in the event of termination of service or non-payment of a service fee, with a time period that the subscriber has to reestablish services with the service provider, then the customer may retain or get the same double number if he re-subscribes before the time period lapses. As such, the subscriber may be given a grace period after non-payment of a service fee before service for the double number is terminated. Therefore, the policy will dictate the time period that a double number remains or is kept in the system so that the double number is not allocated to any other subscriber. If the subscriber does not re-apply for the double number within the grace period, policies for recycling double numbers may be provided so that all possible precautions are taken before a double number is reallocated to a different subscriber. For example, the precautions may include purging all system data relevant to the previous subscriber or the double number.

If the double number service is not available for all number types for a service provider, then care or precaution may be given when changing primary number types, which may terminate the double number services for users converting their numbers. If a subscriber identity module (SIM) is recycled, care or precaution should be taken to make sure the SIM was not associated with a double number subscriber, and if the SIM was associated with a double number subscriber then all data associated with the double number subscriber should be purged on the system to avoid getting erroneously affiliated with the prior double number subscriber.

In further example embodiments, to terminate and/or end service for a double number, a subscriber may submit a double number server termination request via SMS, IVR or a help line call to a customer care representative. Upon the double number platform receiving the service termination request, the double number may be marked or flagged as inactive for purging at a later time. The double number associated with the termination request may then be re-allocated to another subscriber, however the double number may be reallocated at a later time. As such, in one embodiment the double number associated with the terminated request may be placed as the last entry within the available double number pool.

As shown below in FIGS. 3a,b and 4a,b, telephone calls in both directions (to and from a double number subscriber 302) are in one embodiment calls to an IVR system, and hence may be determined within double number server 170. Double number server 170 may be configured to gather information for the caller and callee with respect to number mapping, status, blocking, etc. If the call is in order to be completed, voice channels may then be bridged. However, the call from the caller to callee is only completed if the callee picks up the phone, which may avoid billing in case the callee is unavailable, while playing an unavailability recording or audio to the caller if available.

Figure 3A:
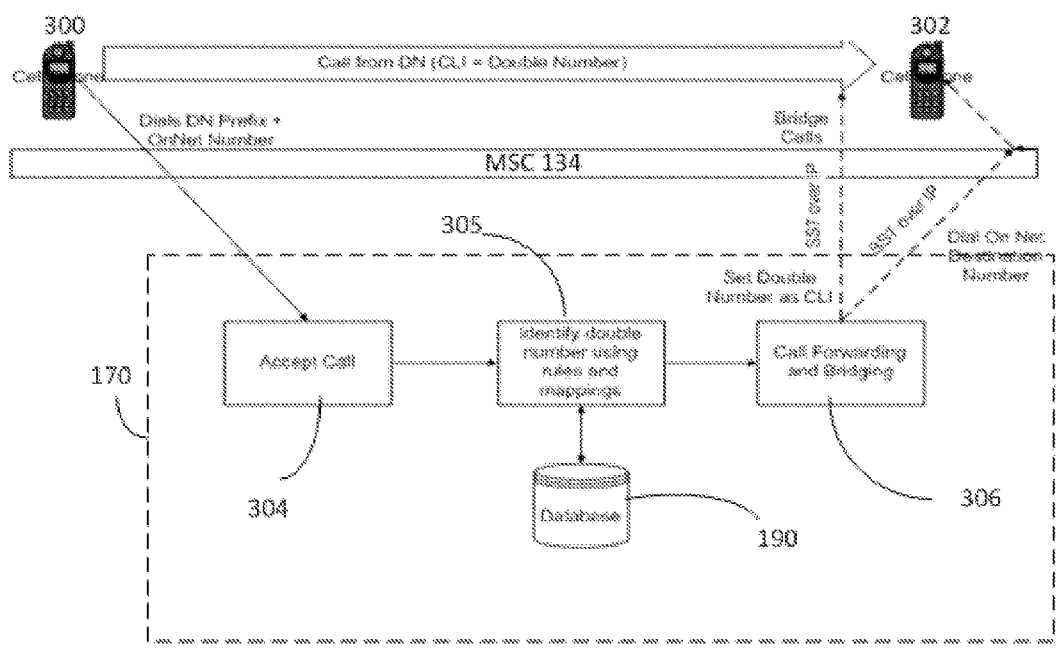
FIG. 3a depicts a hardware diagram of a double number subscriber placing a telephone call according to an embodiment.
Figure 4A:
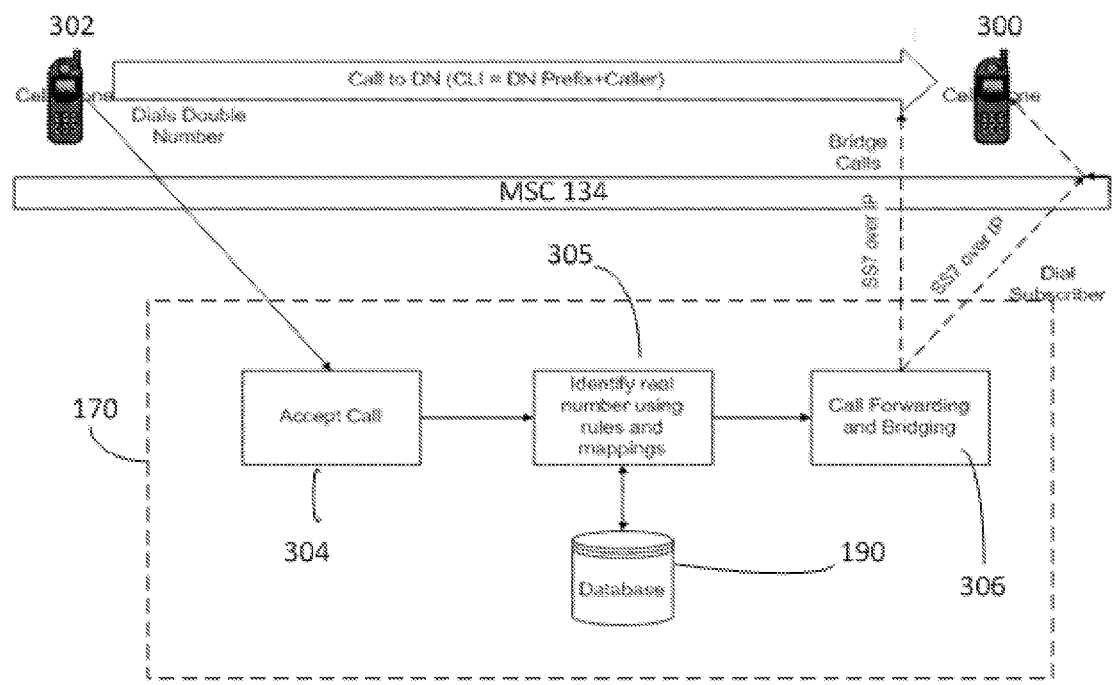
FIG. 4a depicts a hardware diagram of a double number subscriber receiving a telephone call according to an embodiment.

FIGS. 3a and 4a depicts double number subscriber 300, a party operating with a primary number 302, MSC 134, and double number server 170. Double number server 170 may include a receiver 304 configured to receive a communication from MSC 134, a processor 305 configured to identify double numbers using rules and mappings, and a transmitter 306 configured to transmit a communication to MSC 134.

Figure 3B:
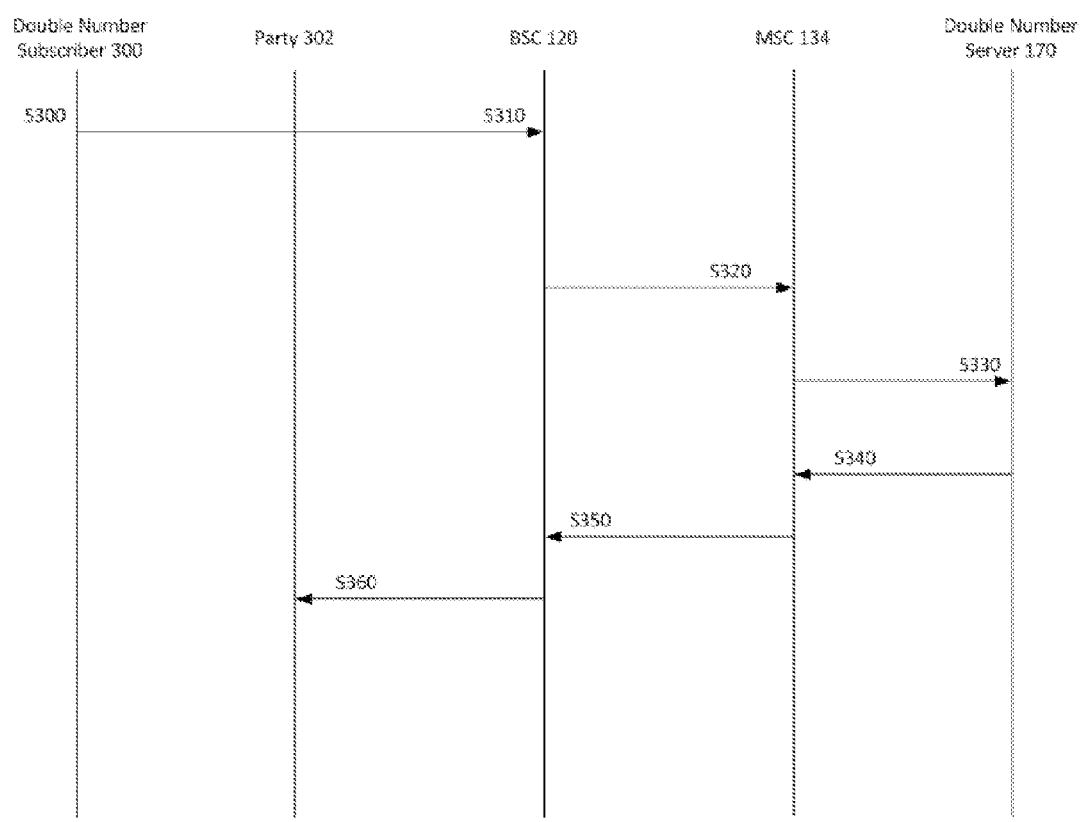
FIG. 3b depicts a flow diagram of a double number subscriber placing a telephone call according to an embodiment.

FIG. 3a depicts a hardware diagram for a subscriber 300 with a double number completing a telephone call to another party 302 utilizing a primary number. FIG. 3b depicts a corresponding flow diagram for FIG. 3a. In the following example, the DN subscriber 300 may have a primary number of 03335551111 and a double number 03330001111. Party 302 may be a normal subscriber with a primary number of 03335552222.

In S300, subscriber 300 may desire to complete a telephone call to another party 302. Subscriber 300 may dial the telephone number of party 302 along with prefix information identifying that subscriber 300 desires to utilize an associated double number. Accordingly, subscriber 302 may dial a prefix (66) and then the primary telephone number of party 302 (03335552222).

In S310, Base Station Controller (BSC) 120 may receive a request that subscriber 300 desires to complete a call to party 302. This request may include the prefix information, the primary telephone number of party 302, and the primary telephone number of subscriber 300. BSC 120 may then forward this request to MSC 134.

In S320, MSC 134 may receive the request from BSC 120, and parse the request and determine if the call includes prefix information or a starting sequence indicating that the call is to be completed utilizing a double number. If the call does indicate that the call is to be completed utilizing a double number, then MSC 134 may forward the request to double number server 170.

In S330, double number server 170 may receive the request to complete a call utilizing a double number from MSC 134. Double number server 170 may then apply rules to determine if the call is to be allowed. The rules applied may be routing rules stored on the server and defined by a subscriber/user by calling the IVR interface or via a web interface. They may include whitelisting or blacklisting of specific MSISDNs/Numbers for calls and SMS, and also time scheduling, where the double number is turned off for a specified time via a weekly schedule, or is turned off at any time via SMS/IVR. All such rules may be checked before a call or SMS is received, and if any rule is violated then the call/SMS may be blocked.

If the call is to be allowed, double number server 170 may modify the request via rules, user preferences and mappings within database 190 so that the telephone number associated with subscriber 300 is the double number. More specifically, the request received by double number server 170 from MSC 134 may indicate that the call is from the primary number associated with subscriber 300 and that the outgoing call included prefix information. Due to the prefix information associated with the outgoing call, double number server 170 may then locate a corresponding double number to the primary number of subscriber 300 within a database. Double number server may then modify the outgoing call request to include the double number of subscriber 300 instead of the primary number of subscriber 300.

In S340, MSC 134 may receive an outbound call request including the double number of subscriber 300 and the telephone number of associated with party 302, and forward the call request to BSC 120.

In S350, BSC 120 may receive the call request and forward the call request to a device associated with party 302. The call request may include the identification of the double number for subscriber 300 instead of the primary number.

In S360, party 302 may receive the call request along with an identification that the call is from the double number for subscriber 300. Thus, for example, caller ID would indicate the caller's number to be the double number.

Figure 4B:
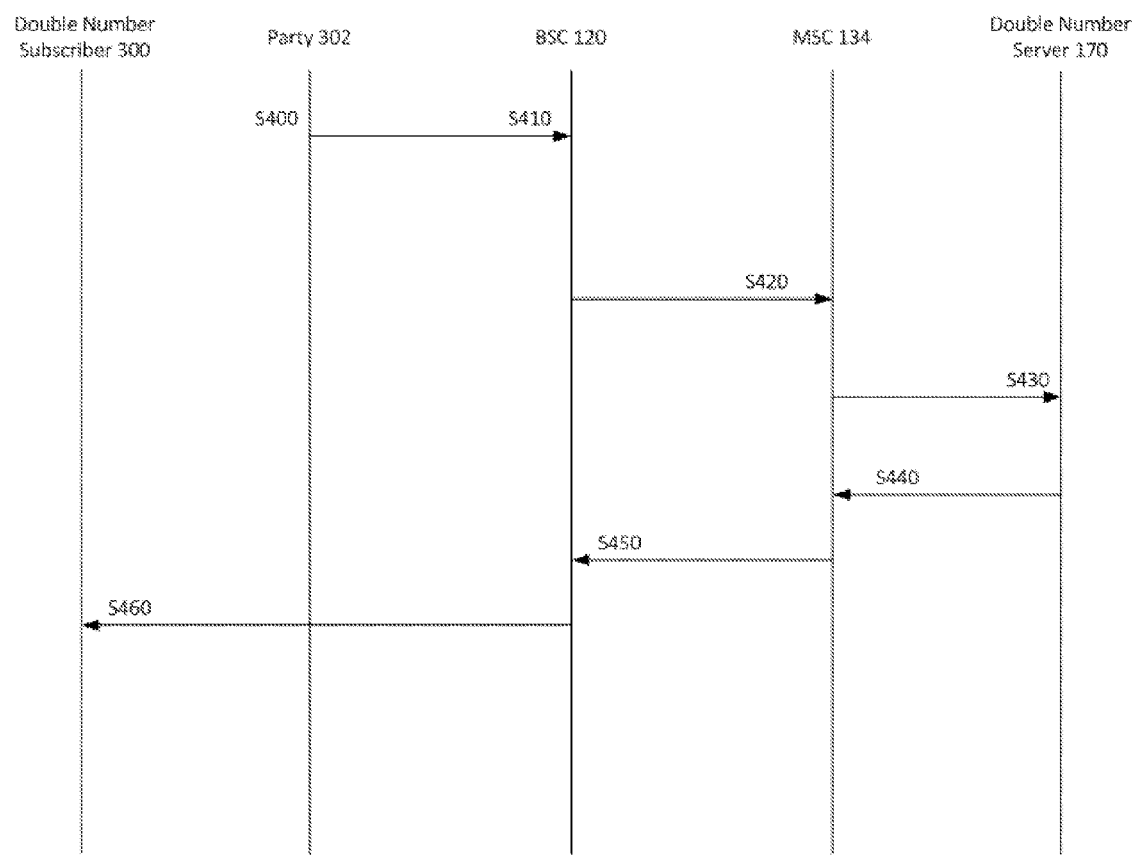
FIG. 4b depicts a flow diagram of a double number subscriber receiving a telephone call according to an embodiment.

FIG. 4a depicts a hardware diagram for a party 302 with a primary number completing a telephone call to a double number subscriber 300 utilizing a double number. FIG. 4b depicts a corresponding flow diagram for FIG. 4a. In the following example, the DN subscriber 300 may have a primary number of 03335551111 and a double number 03330001111. Party 302 may be a normal subscriber with a primary number of 03335552222.

In S400, party 302 may dial a request to initiate a telephone call to a telephone number corresponding with the double number for subscriber 300.

In S410, BSC 120 may receive the request identifying the double number for subscriber 300 and the primary number for party 302, and forward the request to MSC 134.

In S420, MSC 134 may determine if the request includes a dialed number that falls in an allowed double number series, and if the request includes a dialed number within a double number series, may forward the request to double number server 170. More specifically, MSC 134 may utilize a database, table or index identifying telephone numbers for double numbers to determine if the dialed number falls in an allowed double number series.

In S430, double number server 170 may receive the request to complete a call utilizing a double number from MSC 134. Double number server 170 may then apply rules determine if the call is to be allowed.

If the call is to be allowed, double number server 170 may modify the request via rules, user preferences and mappings within database 190 so that the telephone number associated with subscriber 300 is the subscriber's primary number, and the telephone number associated with party 302 is party's 302 primary number with prefix information. More specifically, using the request received by double number server 170 from MSC 134 identifying the primary number of subscriber 300, double number sever 170 may map the primary number to a double number within a look-up-table. Then double number server 170 may initiate an outgoing call request to MSC 134 with the primary number of subscriber 300, along with prefix information for party 302.

In S440, MSC 134 may receive the outgoing call request from double number server 170, which may include the primary number for subscriber 300 and the primary number for party 302 with prefix information. MSC 134 may then forward this request to BSC 120

In S450, BSC 120 may receive the request form MSC 134, and then forward the call to subscriber 300 utilizing the primary number.

In S460, double number subscriber 300 may receive the call from party 302 on the primary number, with an indication that the call was originally placed to the double number corresponding to subscriber 300. Therefore, double number subscriber 300 may realize that the call was originally intended for his/her double number. This indication may for example be the addition of the prefix to the incoming caller's number, as shown for example on the subscriber's caller ID.

Embodiments for a double number subscriber 300 transmitting or receiving SMS messages may be similar to those as described above in FIGS. 3a,b and 4a,b for a double number subscriber transmitting and receiving telephone calls. SMS messages may have to be delivered to double number server 170 over a short message peer to peer (SMPP) connection between the double number server 170 and a SMSC 132. As discussed above, all target double numbers may include short-codes, and hence may be easily routed to SMPP larger accounts. The double number server 170 may transmit the SMS message to a second party after validation and mapping of the double number. One skilled in the art will appreciate that the double number server 170 may transmit SMS messages to SMSC 132, and SMSC 132 may be configured to deliver the SMS to the receiving party.

Figure 5A:
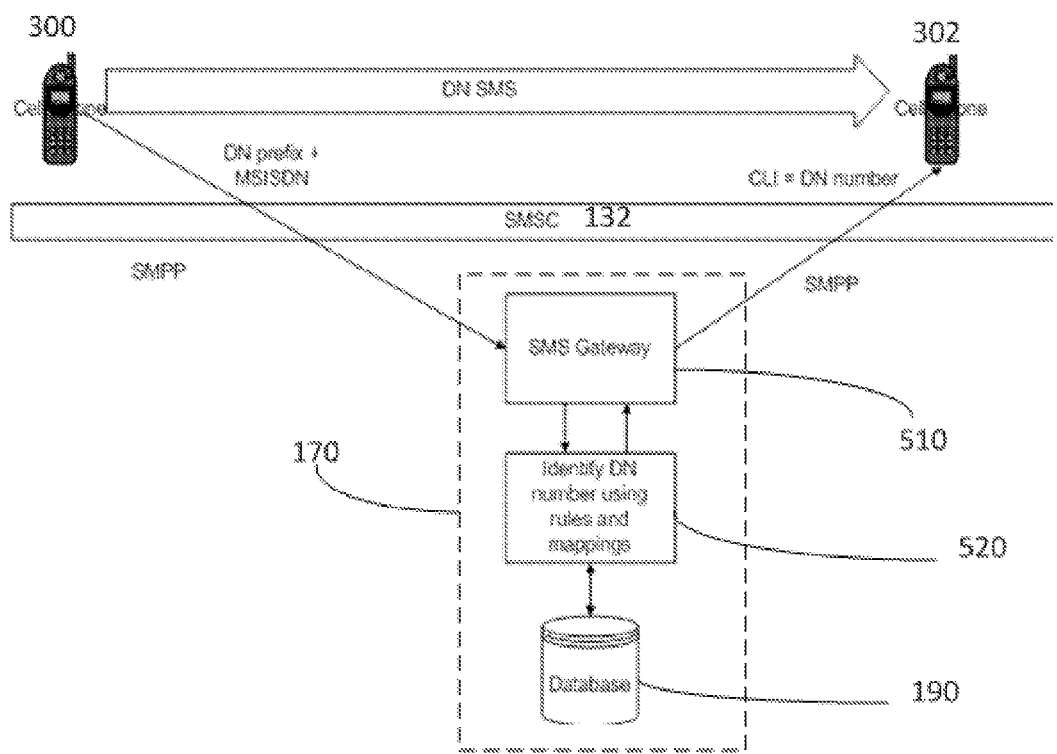
FIG. 5a depicts a hardware diagram of a double number subscriber transmitting an SMS message according to an embodiment.
Figure 5B:
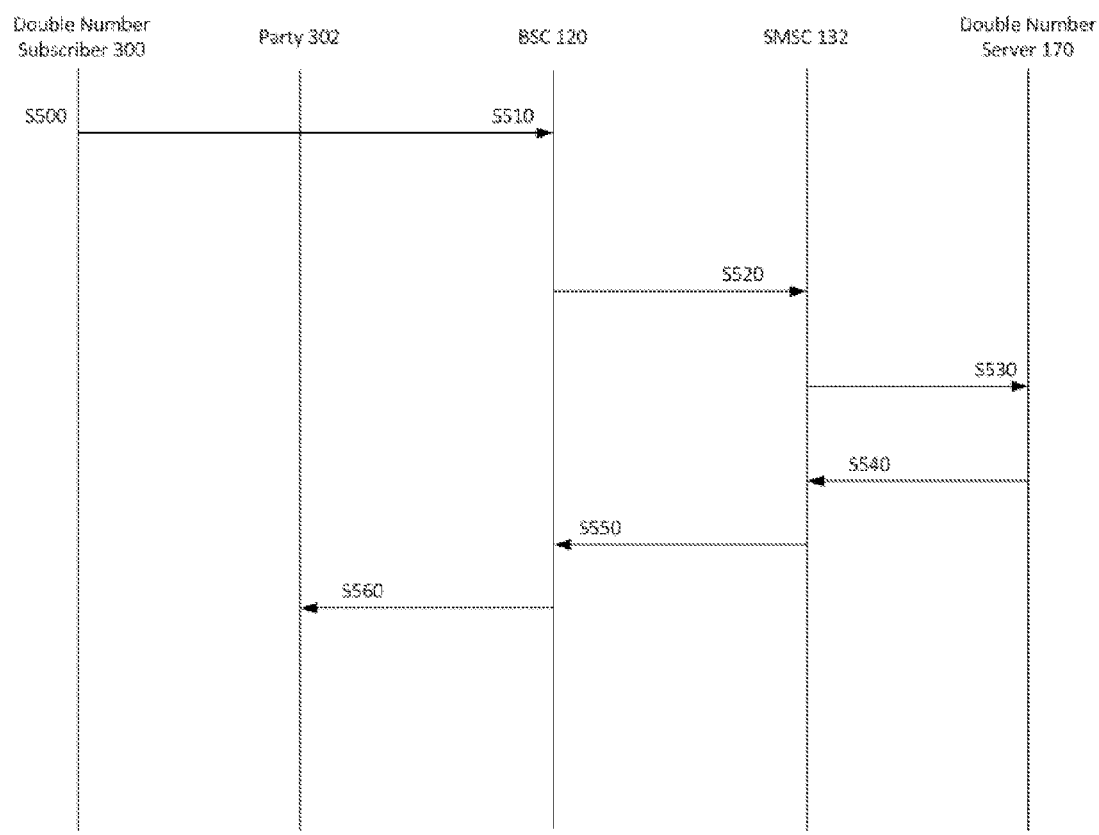
FIG. 5b depicts a flow diagram of a double number subscriber transmitting an SMS message according to an embodiment.
Figure 6A:
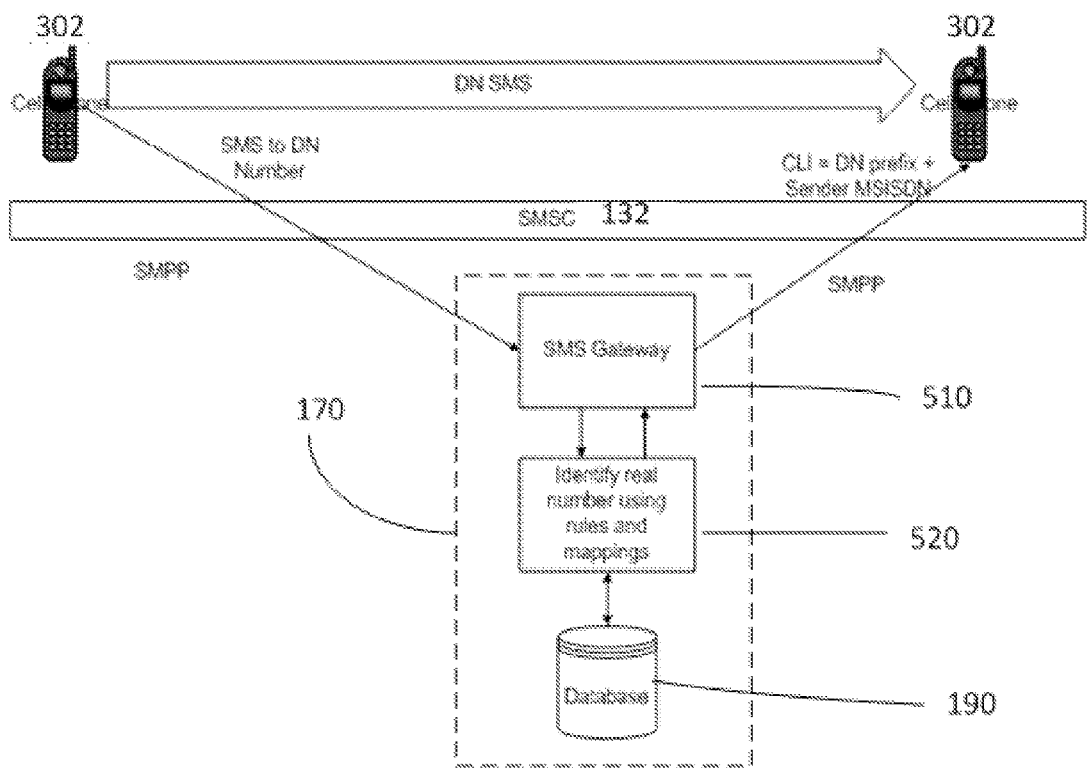
FIG. 6a depicts a hardware diagram of a double number subscriber receiving an SMS message according to an embodiment.
Figure 6B:
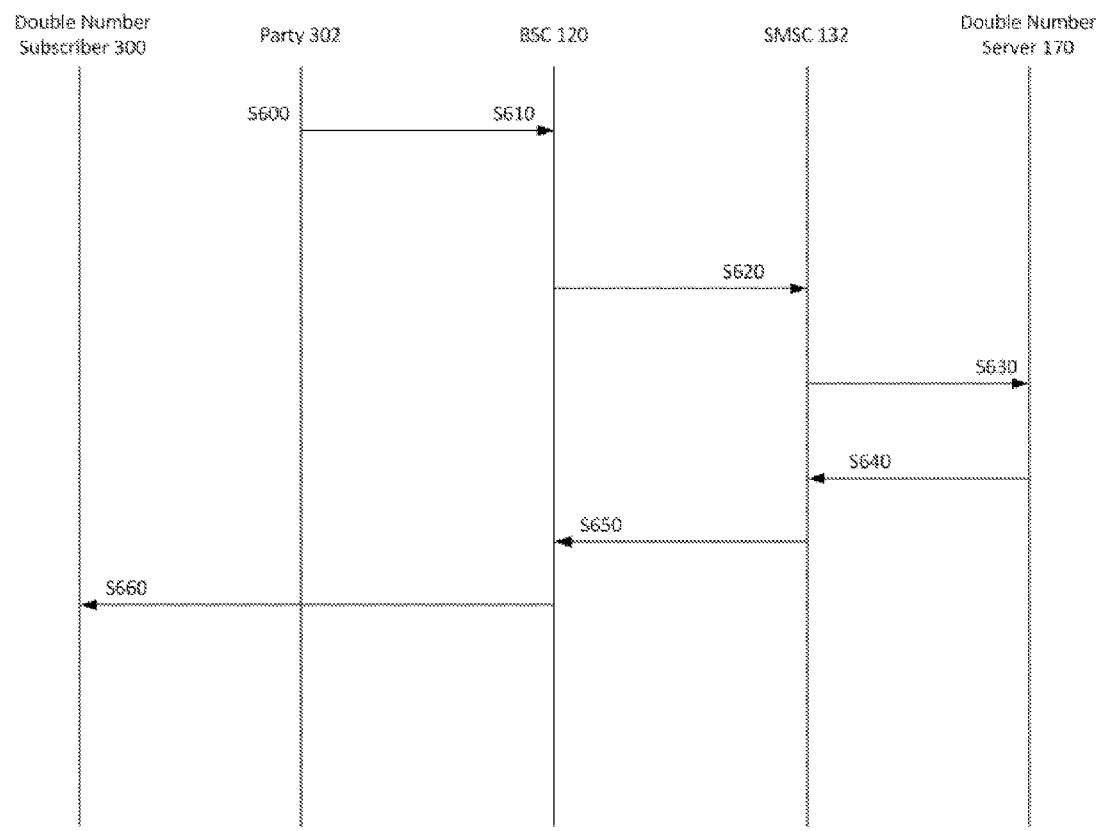
FIG. 6b depicts a flow diagram of a double number subscriber receiving an SMS message according to an embodiment.

FIGS. 5a and 6a depict example embodiments of hardware for a double number subscriber 300 transmitted or receiving an SMS message to another party 302. FIGS. 5b and 6b depict flow diagrams for transmitting and receiving an SMS message utilizing a double number.

FIGS. 5a and 6a depicts double number subscriber 300, a party operating with a primary number 302, SMSC 132, and double number server 170. Double number server 170 may include a SMS Gateway 510 configured to receive and transmit communications to and from SMSC 132 and a processor 520 configured to identify double numbers using rules and mappings.

In S500, double number subscriber 300 may desire to transmit an SMS message to another subscriber or party 302. Subscriber 300 may transmit an SMS message along with prefix information identifying that subscriber 300 desires to utilize an associated double number. Accordingly, subscriber 300 may enter a prefix (66) and then the primary telephone number of party 302 (03335552222).

In S510, BSC 120 may receive a request that double number subscriber 300 desires to transmit an SMS request to party 302. This request may include the prefix information, the primary telephone number of party 302, and the primary telephone number of subscriber 300. BSC 120 may forward the request to SMSC 132.

In S520, SMSC 132 may parse the request and determine if the SMS message includes prefix information or a starting sequence indicating that the SMS message is to be completed utilizing a double number. If the SMS message does indicate that the SMS message is to be completed utilizing a double number, then SMSC 132 may forward the request to double number server 170.

In S530, double number server 170 may receive the request to complete the SMS message utilizing a double number from SMSC 132. Then double number server 170 may modify the request via rules and mappings so that the telephone number associated with subscriber 300 becomes the double number. More specifically, the request received by double number server 170 from SMSC 145 may indicate that the SMS message is from the primary number associated with subscriber 300 and that the outgoing SMS message included prefix information. Due to the prefix information associated with the SMS message, double number server 170 may then locate a corresponding double number within a database to the primary number of subscriber 300. Double number server may then modify the outgoing SMS message request to include the double number of party 302 instead of the primary number of party 302.

In S540, SMSC 132 may receive an outbound SMS request including the double number of subscriber 300 and the telephone number of associated with party 302, and forward the SMS request to BSC 120.

In S550, BSC 120 may receive the SMS request and forward the SMS request to party 302. The SMS request may include the identification of the double number for subscriber 300 instead of the primary number.

In S560, party 302 may receive the SMS message along with an identification that the SMS message is from the double number for subscriber 300.

FIG. 6b depicts a flow diagram for party 302 with a primary number completing an SMS message to a subscriber 300 utilizing a double number. In the following example, the DN subscriber 300 may have a primary number of 03335551111 and a double number 03330001111. Party 302 may be a normal user with a primary number being 03335552222.

In S600, party 302 may transmit an SMS message with a request to transmit an SMS message to a telephone number corresponding with the double number for subscriber 300.

In S610, BSC 120 may receive the request identifying the double number for subscriber 300 and the primary number for party 302, and forward the request to SMSC 145.

In S620, SMSC 132 may determine if the request includes a number that falls in allowed double number series, and if the request includes a number within a double number series, forward the request to double number server 170. More specifically, SMSC 132 may utilize a database, table or index identifying telephone numbers for double numbers.

In S630, double number server 170 may receive the request to transmit an SMS message with a double number from SMSC 132. Then, double number server 170 may modify the request via rules and mappings so that the number associated with subscriber 300 is the primary number, and the number associated with party 302 is the party's 302 primary number with prefix information. More specifically, using the request received by double number server 170 from SMSC 132 identifying the primary number of subscriber 500, double number sever 170 may map the primary number to a double number within a look-up-table. Then double number server 170 may initiate an outgoing SMS request to SMSC 132 with the primary number of party 302 and subscriber 300, along with prefix information.

In S640, SMSC 132 may receive the outgoing SMS request from double number server 170, which may include the primary number for subscriber 300 and the primary number for party 302 with prefix information. SMSC 132 may then forward this request to BSC 120

In S650, BSC 120 may receive the request from SMSC 132, and then forward the SMS message to subscriber 300 utilizing the primary number.

In S660, double number subscriber 300 may receive the SMS message from party 302 on the primary number, with an indication that the SMS message was sent to the double number corresponding to subscriber 300. This indication may for example be the addition of the prefix to the incoming caller's number, as shown for example on the subscriber's caller ID.

Figure 7:
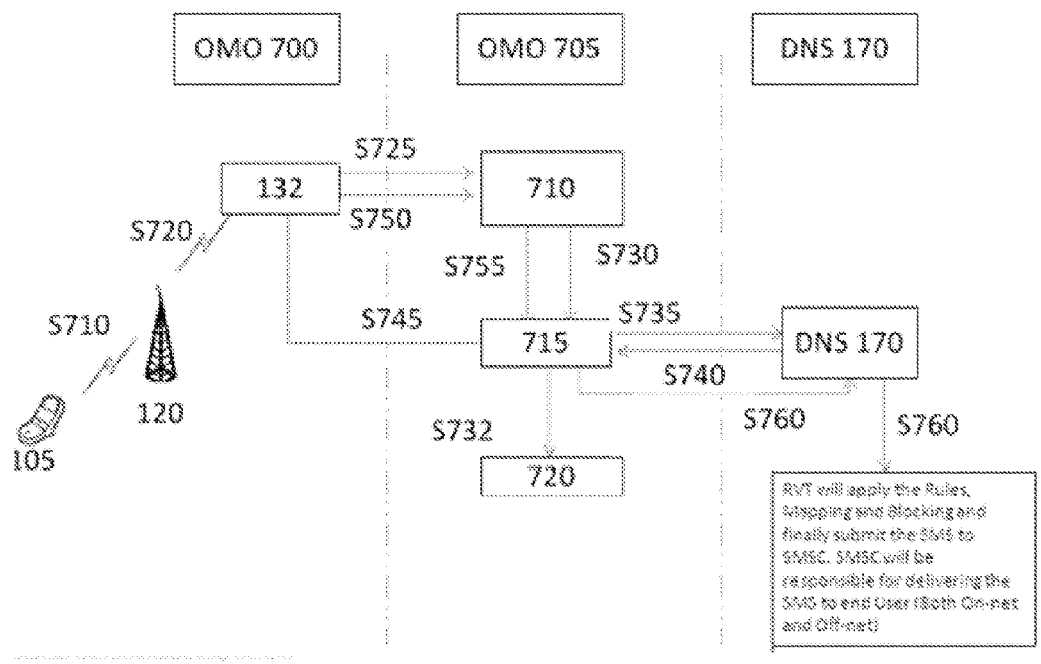
FIG. 7 depicts a diagram of an Off-net SMS being processed by a double number server according to an embodiment.

FIG. 7 depicts an embodiment of a double number system 702 configured to receive an off-net SMS message (message from an outside network). FIG. 7 details receiving SMS on the Double Number System from Other Mobile Operators (OMO) 700, telecommunications network 705, and double number server (DNS) 170. For example, an SMSC 132 may be connected over SMPP to the DNS to process On-Net SMS traffic to and from a double number server. To process off-net SMS traffic a SMS router may be deployed on a double number server, which may be connected to the Signal Transfer Point (STP) to receive the off-net SMS over a Mobile Application Part (MAP) based Signaling System No. 7 (SS7) physical telecommunications medium.

OMO 700 may include a device 105 configured to utilize a double number, base station 120, and SMSC 132. Telecommunications network 705 may include a gateway MSC 710, signal transfer point (STP) 715, and/or home location registry (HLR) 720.

Gateway MSC 710 may be configured to a visited SMSC 132 the device 105 that is to receive an SMS message is currently located at. For example, gateway MSC 710 may be configured to determine the location of SMSC 132. STP 715 may be a router that relays messages between signaling endpoints (SEPs) and other signaling transfer points (STPs). Typical SEPs include service switching points and service control points. STP 715 may be connected to adjacent SEPs and STPs via signaling links. Based on the address fields of the messages, the STP 715 routes the messages to the appropriate outgoing signaling link. For example, STP 715 may route a message received from gateway MSC 710 to double number platform 170. HLR 720 may be a central database that contains details of each phone subscriber that is authorized to use the telecom network 705. Furthermore, HLR 720 may store details of every SIM card issued by the OMO 705. HLR 720 may also be used for normal operation of SMS messages, and be communicably connected to gateway MSC 710 and double number server 170.

Turning now to the steps to complete an OFF-net SMS message, in S710 device 105 may transmit an SMS message to base station 120. In S720, base station 120 may then transmit the SMS message to SMSC 132.

In S725, SMSC 132 may send a routing information request (SRI) to gateway MSC 710.

In, S730 gateway MSC 710 may receive the SRI, and transmit a locate global title (GT) message corresponding to the received SRI message to SIP 720. If device 105 corresponds to an on-net device in S732 STP 720 may then transmit the locate GT message to HLR 720, and if device 105 corresponds to an off-net device 105, in S735 STP 720 may forward the SRI message to double number server 170.

In S740, double number server 170 may acknowledge that the SRI message corresponds to a double user, and may transmit an SRI-ACK message to STP 715.

In response to receiving the SRI-ACK message, in S745 STP 715 may forward the message to SMSC 132. Then in S750, SMSC may transmit a mobile terminated—forward short message (MT-FSM) to gateway MSC 710. Gateway MSC 710 may then forward the MT-FSM to STP 715 in S755. STP 715 may then transmit the MT-FSM message to double number server 170 in S760.

In S765, double number server 170 may apply rules, mapping and blocking features to the MT-FSM. Double number server 170 may then forward the SMS to SMSC 132 which may be configured to deliver SMS to a second party.

In further example embodiments, double number server 170 may be configured to provide billing and charging information associated with a user subscribing to a double number. In one embodiment, a user associated with a double number may be charged at recurring time periods such as on a monthly, weekly or daily basis. Charging of calls made to a double number subscriber may be done by a telecommunications service provider as usual, based on the call originating from the subscriber's mobile or landline device. As such, usual charging may occur for calls targeted to double numbers.

However, calls originating from a double number, i.e. with a double number service prefix, may be charged by flat billing, where any call to the prefix based short-code should be billed at a fixed rate and international calling would not be allowed. Hence, the flat call rate may be applied to any call on any network in the same country, and a complete tariff table of the operator may be replicated with the prefix, which will automatically charge an appropriate amount as if charged for a normal call to the same destination number.

A message delivery amount may be charged if the message is sent from a handset to an MSC of a telecom using the same tariff table as discussed above for calling. The telecom provider may opt to inform its customers regarding the flat charge when the first SMS is sent. In case of cross-carrier messages not being available on SMPP, the double number platform may also support emulating an SMSC with a GT point code over mobile access points (MAP) to receive and acknowledge such messages.

Furthermore, billing and charging may be performed using representational state transfer (REST), simple object access protocol (SOAP), XML-remote procedure call (RPC), or similar protocols exposed by telecommunications networks for billing integration. Moreover, a double number server 170 may be customized to accommodate other kinds of billing mechanisms if desired or required. Therefore, billing may use exposed Application Programming Interfaces (APIs) to charge prepaid and postpaid customers as soon as their charging date is due respectively.

Double number server 170 may be configured to allow for integration with interlaces, such as CSR interfaces, provided to customer support representatives. In other embodiments, some development by telecommunications providers may be required or desired to process information associated with double number subscribers and their services when handling complaints or discrepancies with charging, billing and/or usage of services. For example, an HTTP interface may be exposed by default, while customization to accommodate any other kind of required or desired interface is provided during deployment.

Apart from providing integration operations, a double number server may also be configured to provide a separate web-based interface for operations and maintenance (O&M), and reports regarding system utilization, double number allocation, CDRs, information regarding sent messages, etc. The double number server may also be configured for reports for value added services (VAS)/marketing departments which may include MSISDN inventory utilization, bar graphs, P2P billing minutes, P2P unique users, P2P SMS, subscribers, numbers of users who un-subscribed. P2P successful calls and total active users. In addition to this information, a separate reporting inference may also be provided to a CSR department for customer support.

In even further embodiments, a double number service may be deployed with a comprehensive O&M product to monitor all nodes, hardware resources, and software functionality on all systems deployed for a one-stop view of complete system operations. Alerts may be dispatched to configured email address and as SMS messages to cell phones for immediate attention if required or desired. A history of alerts may also be later viewed.

The O&M platform may be configured to monitor operating systems and resources, specialized software for IVR, SMS, etc., data base server software, and all other components involved for the operation of a double number service.

The double number service may be configured to be deployed on a number of clusters for each type of node. Most of the nodes may be configured to be deployed in N+M redundancy, where N is the number of nodes most required for the operation and M is the number of redundant nodes. Under usual circumstances M<N, while for critical operations N may be equal to M or M>N. The nodes may be IVR, SMS, inter-operation integration, database and O&M, and all the redundant nodes may be deployed in an active load-balancing configuration except O&M, which may be deployed in a passive backup configuration to avoid duplication alerts being dispatched while all nodes are operational.

Single nodes of O&M and databases may be sufficient for the operation of a double number service, and may be deployed in a 1+1 cluster configuration, where O&M is a passive backup and the database is an active load balancing node.

Redundant nodes for a double number service may be deployed in different geographical locations to improve uptime in an event the primary location is unresponsive. However, this may require a higher speed data connection between the two locations and all other connectivity options may be required or desired to be available at both locations, such as SS7, SMPP, etc.

In further embodiments, the double number server may have web interfaces for different components of the double number service. For example, each of the following may have its own user guide and interface to be provided during system deployment: O&M, number provisions, system utilization, CDRs, information regarding received and sent message (not the text of the messages), customer care, policy administration, and access to database with a look-up-table or mapping. The double number service may also have components interacting with each other via internally defined APIs.

The double number service may have different kind or types of nodes in clusters and each node may be expanded without disrupting any other component or node within the system. Hence, for a same number of subscribers making too many calls but not sending an amount of SMS message above a threshold, IVR may be expanded.

The double number service may be configured to include an automatic backup process, which may include restoring the operating system and node-specific applications and data portions.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. For example, the same functionality may be achieved with various hardware setups. Voice T1/E1s may be used connected to telephony boards that do the processing, requiring two voice channels for every call made using the system. Alternatively, data T1/E1s may be used to send data packets identifying who is making a call and what number they are calling, which is used to check if either is a subscriber to a double number service, sends data back regarding the correct number to dial or to identify as the caller's number, and then the call goes out on the switch. In another embodiment, T1/E1s may not be used at all. A person of skill in the art would recognize these various hardware implementations resulting in equivalent functionality.

In other instances, well-known structures, components, systems, materials, or operations are not specifically shown or described in detail to avoid obscuring aspects of embodiments. While the embodiments may be illustrated by using a particular embodiment, this is not and does not limit the invention to any particular embodiment and a person of ordinary skill in the art will recognize that additional embodiments are readily understandable and are a part of the example embodiments.

It will also be appreciated that one or more of the elements depicted in the drawings/figures can also be implemented in a more separated or integrated manner, or even removed or rendered as inoperable in certain cases, as is useful in accordance with a particular application. The invention encompasses every possible combination of the various features of each embodiment disclosed. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What I claim is:

1. A double number system comprising:
    a database configured to include a mapping of subscribers, each entry within the mapping including a primary number and a double number assigned by the double number system to a double number subscriber, both numbers for use on a single communications device of the double number subscriber;
    a receiver configured to receive data associated with a communication between the double number subscriber and a receiving party, the data including the primary number associated with the double number subscriber and a receiving party number associated with the receiving party;
    a processor configured to determine when the communication is associated with the double number subscriber and to modify the data to include the double number for the double number subscriber; and
    a transmitter configured to transmit data associated with the communication including the double number for the double number subscriber and the receiving party number, such that the receiving party cannot ascertain the primary number of the double number subscriber.

2. The double number system of claim 1, wherein the received data further includes prefix information preceding the primary number associated with the double number subscriber.

3. The double number system of claim 2, wherein the processor is configured to determine if the communication is associated with the double number subscriber based on the prefix information and the mapping.

4. The double number system of claim 2, wherein the prefix information is the same for each double number subscriber.

5. The double number system of claim 1, wherein the double number is configured to be displayed at a device associated with the receiving party.

6. The double number system of claim 1, wherein the communication is one of a short message service message or a telephone call.

7. The double number system of claim 1, wherein the primary number is assigned by a service provider and the double number is assigned by the double number server.

8. The double number system of claim 1, wherein the double number subscriber includes a plurality of double numbers.

9. A double number system comprising:
    a database configured to include a mapping of subscribers, each entry within the mapping including a primary number and a double number assigned by the double number system to a double number subscriber, both numbers for use on a single communications device of the double number subscriber;
    a receiver configured to receive data associated with a communication between a first party and the double number subscriber, the data including a primary number associated with the first party and the double number for the double number subscriber;
    a processor configured to determine if the communication is associated with the double number subscriber and to modify the data to include the primary number for the double number subscriber; and
    a transmitter configured to transmit data associated with the communication including the primary number for the double number subscriber and the primary number associated with the first party.

10. The double number system of claim 9, wherein the data the transmitter is configured to transmit further includes prefix information preceding the primary number associated with the first party.

11. The double number system of claim 10, wherein the processor is configured to determine if the communication is associated with the double number subscriber based on the received data including the double number for the double number subscriber and the mapping.

12. The double number system of claim 10, wherein the processor is further configured to block the transmitter from transmitting data based on user preferences, the user preferences being stored within the mapping.

13. The double number system of claim 12, wherein the user preferences are one of blocking user-requested numbers and blocking numbers according to a time of day.

14. The double number system of claim 9, wherein the primary number of the first is configured to be displayed along with prefix information at a device associated with the double number subscriber, the prefix information indicating that the communication was to be communicated to the double number.

15. The double number system of claim 9, wherein the communication is one of a short message service message or a telephone call.

16. The double number system of claim 9, wherein the primary number is assigned by a service provider and the double number is assigned by the double number server.

17. The double number system of claim 9, wherein the double number subscriber includes a plurality of double numbers.

18. A double number system comprising:

a database configured to include a pool of double numbers;

a processor configured to receive a request from a user for a double number within the pool of double numbers and to assign one of the double numbers based on the request, the user request including a primary number assigned by a service provider, wherein both numbers are for use on a single communications device of the user; and an index configured to include a mapping of the primary number, at least the double number assigned to a subscriber and user preferences of the user to enable selection of either the primary number or the double number based on said user preferences to complete a call.

19. The double number system of claim 18, wherein the user preferences are one of blocking numbers for user requested numbers and blocking numbers according to a time of day.

20. The double number system of claim 18, wherein the request includes a desire to be assigned to a specific double number.

21. A double number system comprising:

a database configured to include a mapping of subscribers, each entry within the mapping including a primary number and a double number assigned by the double number system to a double number subscriber, both numbers for use on a single communications device of the double number subscriber;

a receiver configured to receive data associated with a communication between the double number subscriber and a receiving party, the data including the primary number associated with the double number subscriber and a receiving party number associated with the receiving party;

a processor configured to determine if the communication is associated with the double number subscriber and to select a selected number which comprises either the double number or the primary number according to user preferences associated with the mapping; and a transmitter configured to transmit data associated with the communication to include the selected number for the double number subscriber and the receiving party number.

* * * * *